Feb. 14, 1967 R. D. GRAYSON 3,304,002
DUAL-PILOTED THERMOSTATICALLY CONTROLLED DIAPHRAGM VALVE
Filed Jan. 18, 1965
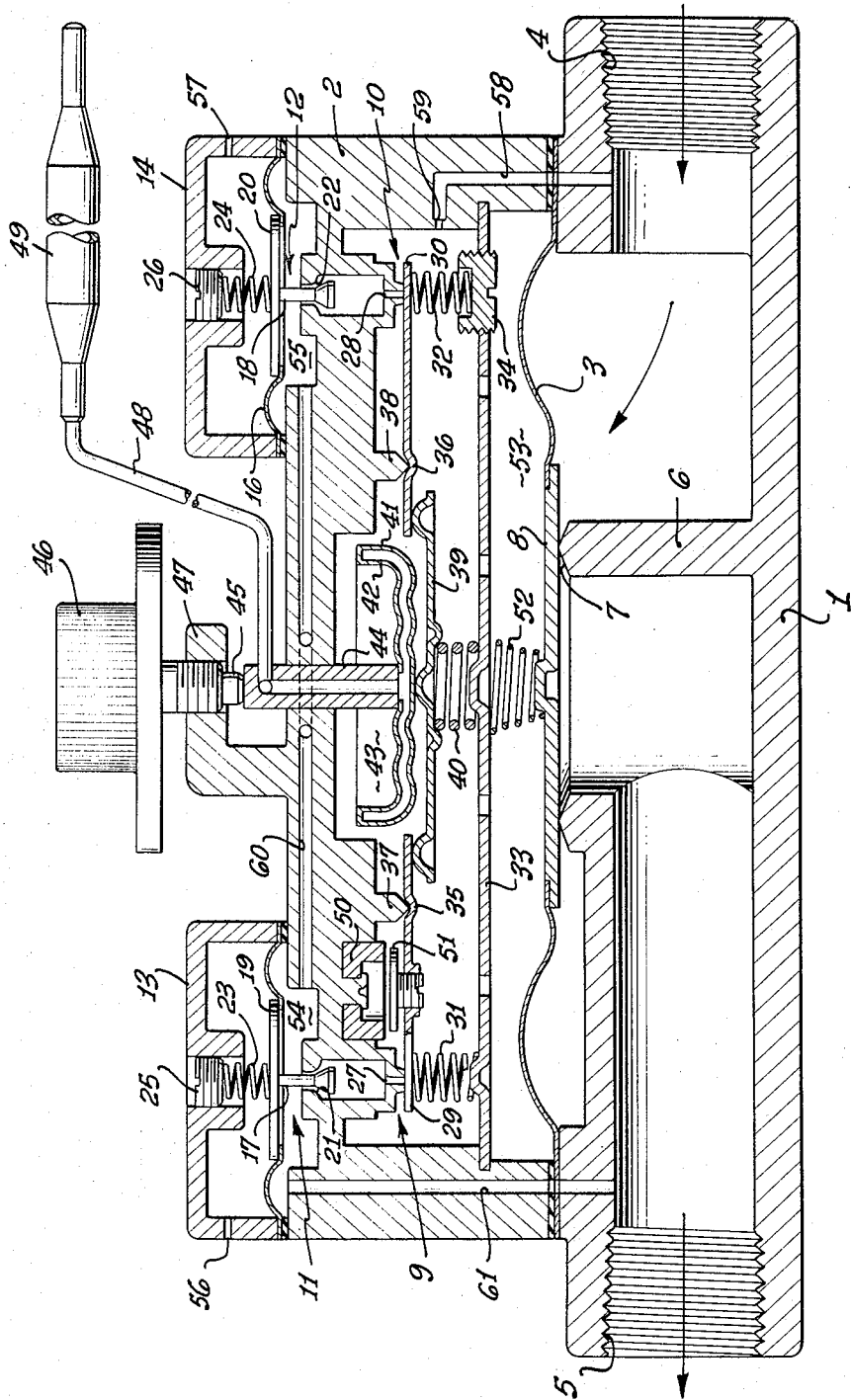
INVENTOR.
RICHARD D. GRAYSON
By 
ATTORNEY.

United States Patent Office 3,304,002
Patented Feb. 14, 1967

3,304,002
DUAL-PILOTED THERMOSTATICALLY CONTROLLED DIAPHRAGM VALVE
Richard D. Grayson, Arcadia, Calif., assignor to International Telephone and Telegraph Corporation, New York, N.Y., a corporation of Maryland
Filed Jan. 18, 1965, Ser. No. 426,263
8 Claims. (Cl. 236—80)

This invention relates in general to piloted diaphragm valves and in particular to valves of the foregoing character in which a pair of pilot valves are controlled by a common thermostatic mechanism to provide off, low-flow and high-flow positioning of the valve diaphragm.

It is known to provide piloted diaphragm valves in which a pilot valve is controlled by a thermal actuator to open and close a main valve for the controlled passage of fluid therethrough. It is also known to control fluid pressure by controlling the outward flow of fluid from the valve diaphragm chamber. However, these systems have the disadvantage that a desirable low-flow condition cannot be established since the valve is moved from the off position to the fully-on position under control of the thermostatic mechanism.

Accordingly, one object of the present invention is to overcome the foregoing disadvantage by providing a pair of sequentially operated pilot valves which control the operation of the valve from an off position to low-flow condition and, according to continued thermostatically controlled demand, to control the operation of the valve from a low-flow condition to a high flow condition.

A feature related to the above object is concerned with providing a pair of pilot pressure regulators for respective pilot valves to regulate the fluid pressure at the low-flow or high-flow levels.

Another object is to provide a dual-piloted thermostatically controlled diaphragm valve wherein a common thermal actuator responding to a single temperature responsive device controls both pilot valves.

Still another object is to provide adjusting means for controlling the pilot valves to be responsive at various selected temperatures.

A further object is to provide means for controlling at least one of the pair of pilot valves to move from one position to another by snap-action movement.

Other objects relate to the provision of a diaphragm valve of the foregoing description which is economical to manufacture and extremely reliable in operation.

Still more objects and features of the invention will become apparent and the invention will be best understood when the specification and claims are read in conjunction with the accompanying drawing which shows a diagrammatic view of the inventive dual-pilot thermostatically controlled diaphragm valve.

In a fluid valve of the type shown, the main fluid flow is controlled by a main single diaphragm valve which serves to regulate the fluid supply to an associated burner, either at high pressure position for full flow, at low pressure position for reduced flow, or at off position; all positions controlled by a thermostatic device. In maintaining high or low pressures, the diaphragm valve acts as a pressure regulator, varying its opening as required to produce a constant outlet pressure at a preset level.

The diaphragm valve is governed by a thermostatic pilot control mechanism which includes a well-known temperature sensing bulb. The desired temperature is selected by setting a temperature dial to a desired point.

As the room temperature drops slightly below the selected level, the diaphragm valve will open and regulate the outlet pressure at a low level. If the temperature continues to drop, the valve will modulate to a high full-flow level. Subsequently, the valve may modulate between low and high levels in response to small temperature changes in the vicinity of the thermal responsive device.

If the temperature rises, the valve will proportion to a low-flow level or position as the temperature reaches the selected setting. If the temperature increases beyond the selected setting, the valve will assume its off position.

The manner in which the foregoing is accomplished will now be described.

Referring to the drawing, there is illustrated a valve body having cooperating lower and upper casings 1 and 2 with casing 1 having aligned inlet and outlet openings 4 and 5, respectively. A circular partition 6 between the inlet and outlet forms, at its upper end, a raised valve seat 7 engageable with a valve closure member 8 which is suitably secured to a flexible diaphragm 3. The diaphragm 3 is sealingly secured between lower and upper casings 1 and 2. The valve closure member 8 is normally maintained in the closed position shown in the drawing and is opened to a first or low-flow position by operation of a first auxiliary valve 9 and is subsequently opened to a second or high-flow position by operation of a second auxiliary valve 10. The amount of opening of closure member 8 to low-flow or high-flow position is controlled by respective pressure regulators 11 and 12 which regulate the pressure in outlet 5. The operation of the closure 8 to its two open positions, the operation of auxiliary valves 9 and 10, and the functioning of pressure regulators 11 and 12 will become more apparent from the following description.

A pair of pressure regulator casings 13 and 14 are secured to opposite ends of upper casing 2 and sealingly clamp respectively corresponding pressure regulating diaphragms 15 and 16 in position. The diaphragms 15 and 16 each include a valve stem 17 and 18, respectively, which are rigidly secured at one end to respectively corresponding diaphragm plates 19 and 20. The other ends of the valve stems are centrally positioned within respectively correspondingly valve seats 21 and 22. The valve stems 17 and 18 are normally biased out of seating relationship with their respective seats 21 and 22 by springs 23 and 24 urging the diaphragm plates 19 and 20 in a downward direction. The tension of springs 23 and 24 is adjustable by adjustment screws 25 and 26.

Pilot valve assemblies 9 and 10 are associated with respective pressure regulators 11 and 12 and the ports 27 and 28 thereof are selectively opened and closed by pilot valve closures 29 and 30 which normally are held in fluid sealing relationship by springs 31 and 32 positioned between the closures and a rigidly secured common retaining plate 33 extending between the walls of the upper casing 2. The tension of spring 32 is adjustable by adjusting screw 34 threadingly engaging plate 33. The retaining plate 33 also serves as a support for spring 52 which urges diaphragm 3 and closure 8 in its closed illustrated position.

The closure members 29 and 30 are elongated rectangular elements having a pivot point socket 35 and 36 located intermediate their ends for receiving respective pivot points 37 and 38. The ends of the closures 29 and 30, remote from the valve ports 27 and 28, overlappingly engage a circular common thermal actuator disc 39 which is urged against the noted overlapping ends of the closures by spring 40 supported on the retaining plate 33 and engaging the underside of the disc 39.

The upper surface of the actuator disc 39 abuts the outer diaphragm 41 of the dual-diaphragmed sensing head 43 preferably at a single point. The sensing head 43 is rigidly secured to a shaft 44 which is arranged for axial movement under control of an axially adjustable shaft 45 of the temperature setting dial 46 which is threadly supported in flange 47 of upper casing 2.

A capilliary tube 48 interconnects the chamber enclosed by flexible diaphragms 41 and 42 with the thermal bulb 49. The last-said chamber, the capilliary tube and thermal bulb are completely filled and sealed with a thermal expansive liquid therein.

A permanent magnet 50 is rigidly secured in the upper casing 2 in flux-linking relationship with armature 51 which is located in closure 29 intermediate the valve 9 closure end and pivot point 37. Armature 51 is threadedly positioned in closure 29 for adjusting purposes.

The described construction defines a main chamber 53 located above diaphragm 3, a first auxiliary chamber 54 located below the diaphragm 15, and a second auxiliary chamber 55 located below the diaphragm 16. The chambers located above diaphragms 15 and 16 are vented to the atmosphere by ports 56 and 57.

A passageway 58, with its restriction 59, interconnects the inlet 4 with the main chamber 53 and a common passageway 60 interconnects chambers 54 and 55. An extension 61 of passageway 60 interconnects both chambers 54 and 55 with outlet 5.

While the inventive valve is shown in diagrammatic form for purposes of description, it is to be understood that numerous other constructions could be utilized without departing from the spirit of the invention.

A description of the operation of the valve in responding to temperature variations will now be given. It is assumed that the ambient temperature of the thermal bulb 49 is in excess of the setting of the temperature dial 46 which has been previously calibrated.

Under the assumed conditions, fluid from inlet 4 has passed through passageway 58 and restriction 59 into the main chamber 53. Since both sides of diaphragm 3 have inlet pressure thereon, no pressure differential exists thereacross and spring 52 maintains closure 8 in sealing relationship with valve seat 7 and no fluid passes to outlet 5.

When the ambient temperature of thermal bulb 49 decreases, the expansive liquid therein contracts and flexible diaphragm 41 of the thermal sensing head 43 is permitted to contract toward diaphragm 42 as a result of the compression of spring 40 thereon through the medium of the common thermal actuator plate 39. At the same time, actuator plate 39 is moved vertically.

As plate 39 is moved vertically, the outer periphery thereof contacts the noted overlapping ends of closures 29 and 30. Closure 29 is urged against movement about its pivot 37 by the attractive force of magnet 50 on armature 51 and spring 31 while closure 30 is urged against movement about its pivot 38 by spring 32. Spring 32 offers greater resistance to the movement of its associated closure than the attractive force of permanent magnet 50 and the compressive force of spring 31. Thus, the compressive force of spring 40, when released by the movement of diaphragm 41, overcomes the attractive force of the magnet 50, and the force of spring 31. Accordingly, the closure 29 suddenly pivots about its pivot 29 and opens the port 27 with a snap-action movement. At this time, the thermal actuator 39 assumes a tilted position in a clockwise direction.

The fluid in main chamber 53 passes through port 27 into chamber 54 which is connected by passageway 61 to the outlet 5. The pressure in the main chamber 53 will thus decrease according to the setting of the tension of spring 23 of the first pressure regulator 11. The reduced pressure in chamber 53 results in a pressure differential across diaphragm 3 which moves in the upward direction and opens closure 8 to permit passage of fluid from inlet 4 to outlet 5. Diaphragm 15 of the pressure regulator 11 will control the position of valve stem 17 in its seat 21 and thereby control the pressure in outlet 5. The adjustment of spring 23 is such that closure 8 will only open partially and permit a low rate of flow of fluid to outlet 5 from inlet 4.

If the low flow of fluid to outlet 5 is sufficient to raise the ambient temperature through the medium of a combustion chamber, for example, the liquid in bulb 49 will cause downward movement of diaphragm 41 of the temperature sensing head and return the common actuator 39 to its illustrated position. At that time, closure 29 will close port 27 as a result of spring 31 pivoting closure 29 to its illustrated position and by action of the permanent magnet attracting the armature 51. The closing of port 27 will permit equalization of the pressure across diaphragm 3 and result in the seating of closure 8 on valve seat 7 by compression of spring 52.

If, on the other hand, the low-flow of fluid was insufficient to cause an increase in the ambient temperature of bulb 49, the low-flow would continue as described as long as the noted ambient temperature did not change.

Assuming that the ambient temperature of bulb 49 continued to decrease, the flexible diaphragm 41 would continue to move vertically and the force of spring 40 on the tilted actuator plate would overcome the force of spring 32, permitting closure 30 to pivot about its pivot 38 and open port 28 of valve 10. At this time, the actuator plate 39 would be level and both closures 29 and 30 would be operated.

The pressure regulator 12 is adjusted to permit a greater pressure in outlet 5 and thus creates a greater pressure differential across diaphragm 3 than created by pressure regulator 11. Thus, closure 8 would open a greater distance from its valve seat 7 and permit a high-flow of fluid to outlet 5.

When the ambient temperature of the thermal bulb corresponds to the temperature dial setting, the actuator plate 39 will be restored to normal position and the closures 29 and 30 will close their respective ports 27 and 28. At this time, a pressure equilibrium will exist across diaphragm 3 and closure 8 will seat on valve seat 7 terminating fluid flow from inlet 4 to outlet 5.

The foregoing describes the operation of a diaphragm valve between off, low-flow and high-flow positions under control of two separate pilot valves and associated regulators controlled in common by a single temperature sensing device.

While not illustrated, it is to be understood that the shaft of the temperature setting dial could directly contact the actuator 39 on one side of an additional pivot point and the sensing head of the thermal bulb could contact the actuator 39 on the other side of the additional pivot point to define a four-point tilting actuator rather than the disclosed three-point actuator.

While I have described my invention in conjunction with specific apparatus, it is to be understood that numerous other combinations and constructions could be made, as above pointed out, without departing from the spirit of the invention.

What is claimed is:

1. A fluid valve for controlling the flow of fluid from an inlet to an outlet in response to the operation of a normally closed pressure responsive diaphragm positioned between a main chamber and said inlet, conduit means interconnecting said main chamber with said inlet to establish a pressure equilibrium therebetween, first and second auxiliary chambers each including passage means interconnecting said auxiliary chambers with said main chamber, a pair of sequentially operable control valves including a pair of unequally biased valve closures for controlling the passage of fluid from said main chamber to said auxiliary chambers through said passage means, conduit means interconnecting said auxiliary chambers with said outlet, pressure regulator means included with each of said auxiliary chambers to control the pressure in said outlet through the last said conduit means, the pressure regulating means for said second chamber being set to provide a higher pressure in said outlet than the pressure regulating means for said first chamber, thermostatically controlled actuator means linked to said control valve closures and operable responsive to temperature variations to sequentially operate said control valves, whereby first and second pressure differentials between said inlet and said main chamber are sequentially established by the passage of fluid from the main chamber to said auxiliary chambers, the establishment of said pressure differentials moving said diaphragm from said closed position to first and second operated positions sequentially.

2. A fluid valve as set forth in claim 1 wherein adjustable means are provided for varying the pressure requirements of said pressure regulators.

3. A fluid valve as set forth in claim 1 wherein the said thermostatically controlled actuator means includes a pivoted element interlinking said closures, movement of said linking element moving said closures in a sequential order as determined by the magnitudes of the biasing forces of said closures.

4. A fluid valve as set forth in claim 3 including magnetic means connected to operate at least one of said closures with snap-action movement.

5. A fluid valve as set forth in claim 3 wherein said actuator means includes means forming an adjustable point about which the said linking element is pivoted and including selectively operable temperature setting means for controlling the location of said pivot point.

6. A fluid valve as set forth in claim 3 wherein said thermostatically controlled means includes a thermal expansion bulb connected to cause movement of said linking element.

7. A fluid valve for controlling the flow of fluid from an inlet to an outlet in response to the operation of a normally closed pressure responsive diaphragm positioned between a main chamber and said inlet, conduit means interconnecting said main chamber with said inlet to establish a pressure equilibrium therebetween, first and second auxiliary chambers each including passage means interconnecting said auxiliary chambers with said main chamber, conduit means interconnecting said auxiliary chambers with said outlet, each of said auxiliary chambers including pressure regulating means for controlling the pressure in said outlet through the last-said conduit means, said pressure regulating means being set to provide different pressures in said outlet a pair of sequentially operable control valves for controlling the passage of fluid from said main chamber to said auxiliary chambers, a pair of unequally biased pivoted closures each controlling respective control valves, a pivoted element interlinking said closures and movable in response to actuation of temperature controlled sensing means to pivot said closures in a predetermined sequential order, whereby first and second pressure differentials of an amount controlled by said pressure regulators are sequentially established in said main chamber by the pressure controlled passage of fluid from the main chamber to said auxiliary chambers, the establishment of said pressure differentials moving said diaphragm from said closed position to first and second operated positions sequentially.

8. A fluid valve as set forth in claim 7 wherein means are provided for adjusting the bias of at least one of said closures.

References Cited by the Examiner
UNITED STATES PATENTS

| | | | |
|---|---|---|---|
| 2,743,870 | 5/1956 | Drow | 236—48 |
| 2,876,951 | 3/1959 | Matthews | 236—84 |
| 3,235,180 | 2/1966 | Graham et al. | 236—80 |

ALDEN D. STEWART, *Primary Examiner.*